United States Patent
Eguchi

(10) Patent No.: US 9,554,006 B2
(45) Date of Patent: Jan. 24, 2017

(54) INFORMATION PROCESSING APPARATUS, IMAGE FORMING APPARATUS, AND PROCESSING IMAGE SELECTION METHOD

(71) Applicant: KYOCERA Document Solutions Inc., Osaka (JP)

(72) Inventor: Takeshi Eguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/929,236

(22) Filed: Oct. 30, 2015

(65) Prior Publication Data

US 2016/0127586 A1    May 5, 2016

(30) Foreign Application Priority Data

Oct. 30, 2014  (JP) .................................. 2014-221680

(51) Int. Cl.
*H04N 1/00*  (2006.01)
*G03G 15/00*  (2006.01)

(52) U.S. Cl.
CPC ........ *H04N 1/00482* (2013.01); *G03G 15/502* (2013.01); *H04N 1/0032* (2013.01); *H04N 1/0049* (2013.01); *H04N 1/00384* (2013.01); *H04N 1/00453* (2013.01)

(58) Field of Classification Search
CPC .................... H04N 1/00453; H04N 1/00461
See application file for complete search history.

(56) References Cited

U.S. PATENT DOCUMENTS

| 8,934,050 | B2* | 1/2015 | Imai | ................... H04N 5/23216 348/333.02 |
| 2008/0141885 | A1* | 6/2008 | Hu | ........................... B41M 5/00 101/483 |
| 2008/0271617 | A1* | 11/2008 | Ebisawa | ................. B41L 13/06 101/114 |

(Continued)

FOREIGN PATENT DOCUMENTS

| JP | 2008-052496 A | 3/2008 |
| JP | 2010-044498 A | 2/2010 |

*Primary Examiner* — David Gray
*Assistant Examiner* — Sevan A Aydin
(74) *Attorney, Agent, or Firm* — Hawaii Patent Services; Nathaniel K. Fedde; Kenton N. Fedde

(57) ABSTRACT

Provided is an image forming apparatus with which, in selecting one of plural processing image areas in one image, even an inexpensive display unit will not lower the convenience. An information processing part of image forming apparatus includes a division number questioning part, answer receiving part, image dividing part, key highlighting part, processing image selection part, and reporting display part. Division number questioning part makes a question about a required image division number. Answer receiving part receives an answer. Image dividing part displays image, dividing it into plural processing image areas by the required image division number answered. Key highlighting part highlights keys corresponding to processing image areas. Processing image selection part selects processing image area corresponding to a key operated, as processing object. Upon a highlighted key being operated, reporting display part reports that processing image area corresponding to that key is selected as processing object.

10 Claims, 14 Drawing Sheets

(56) References Cited

U.S. PATENT DOCUMENTS

| | | | | |
|---|---|---|---|---|
| 2011/0001989 A1* | 1/2011 | Pesar | ................ | H04N 1/00411 |
| | | | | 358/1.2 |
| 2011/0292237 A1* | 12/2011 | Imai | ...................... | H04N 9/735 |
| | | | | 348/223.1 |
| 2014/0098263 A1* | 4/2014 | Kobuna | ............... | H04N 5/2351 |
| | | | | 348/234 |

* cited by examiner

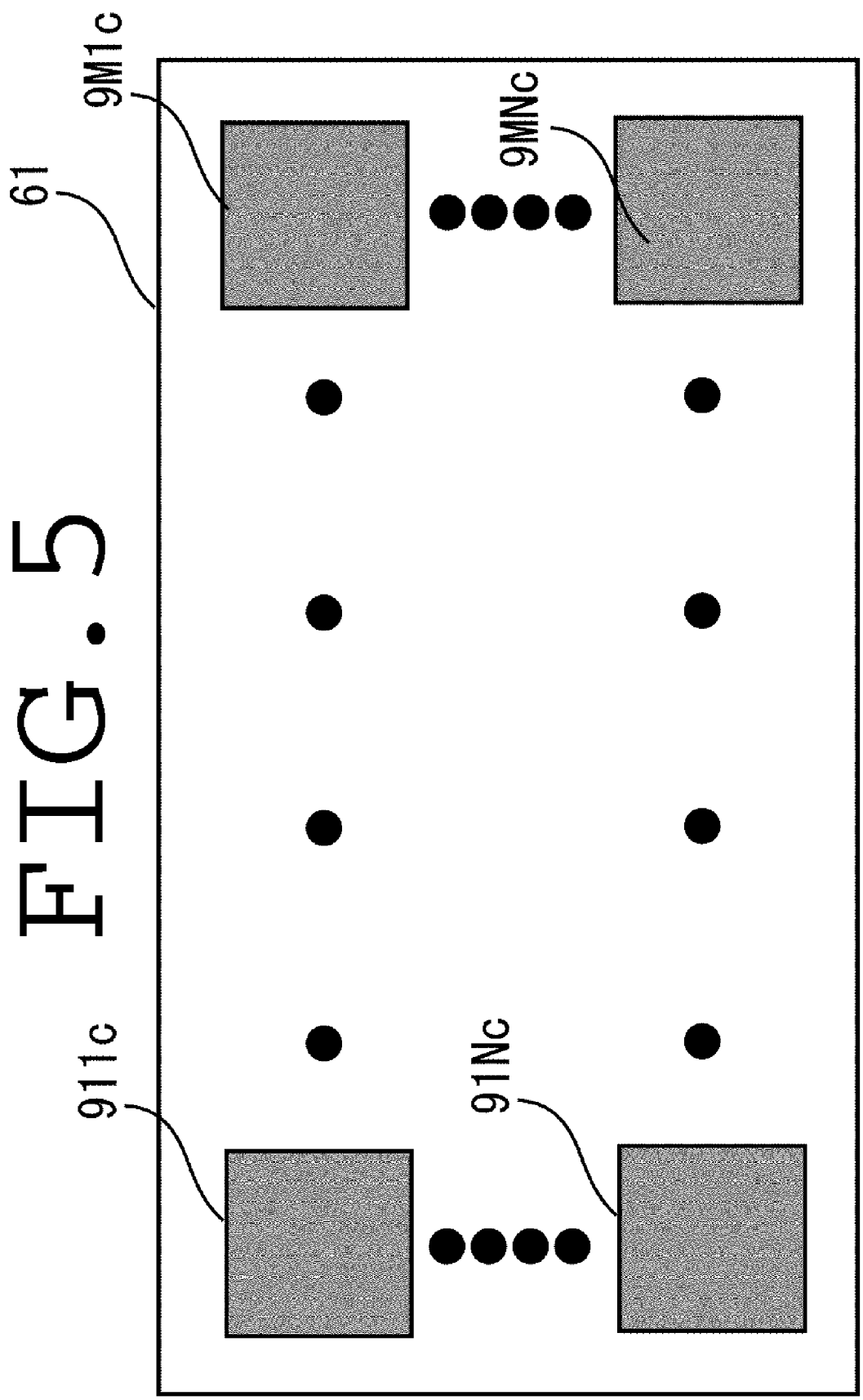

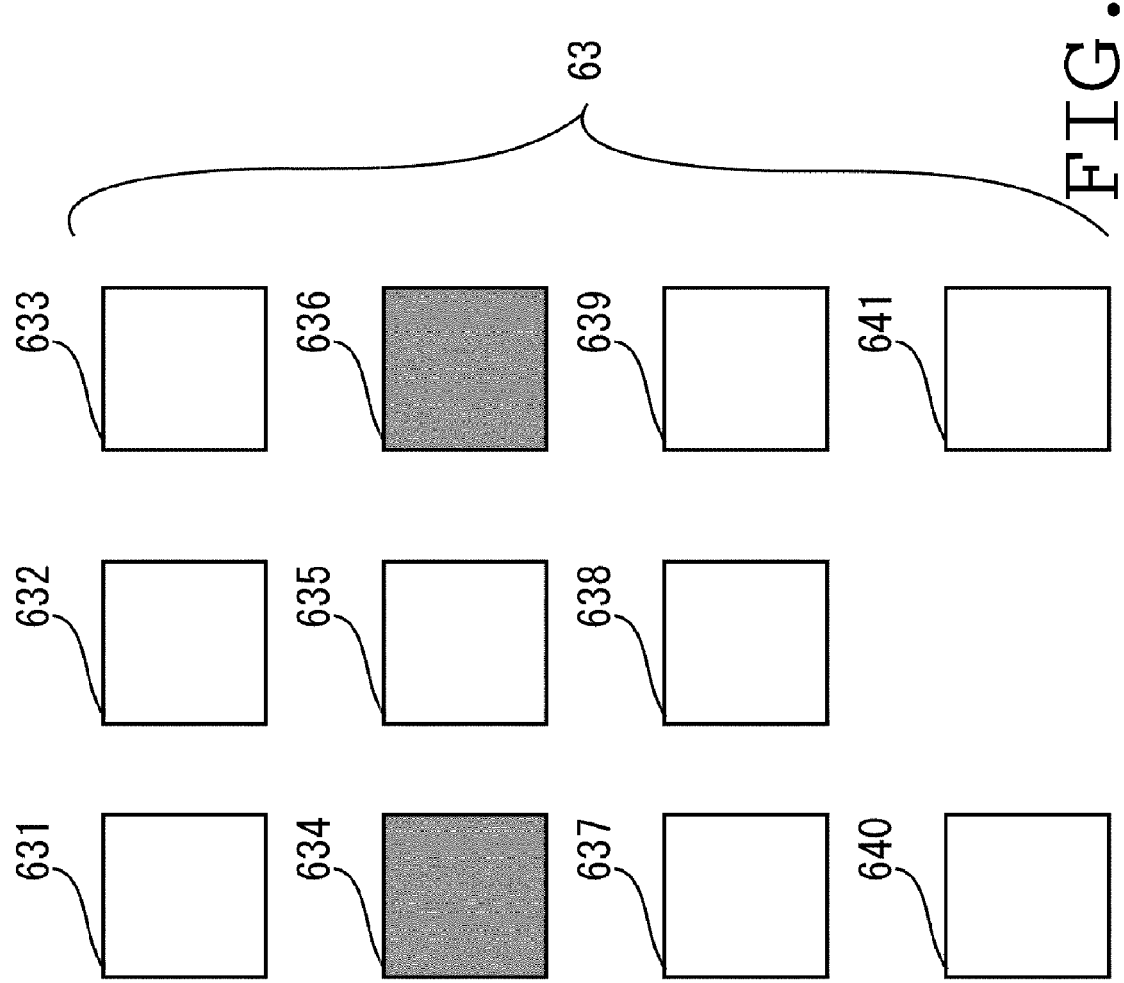

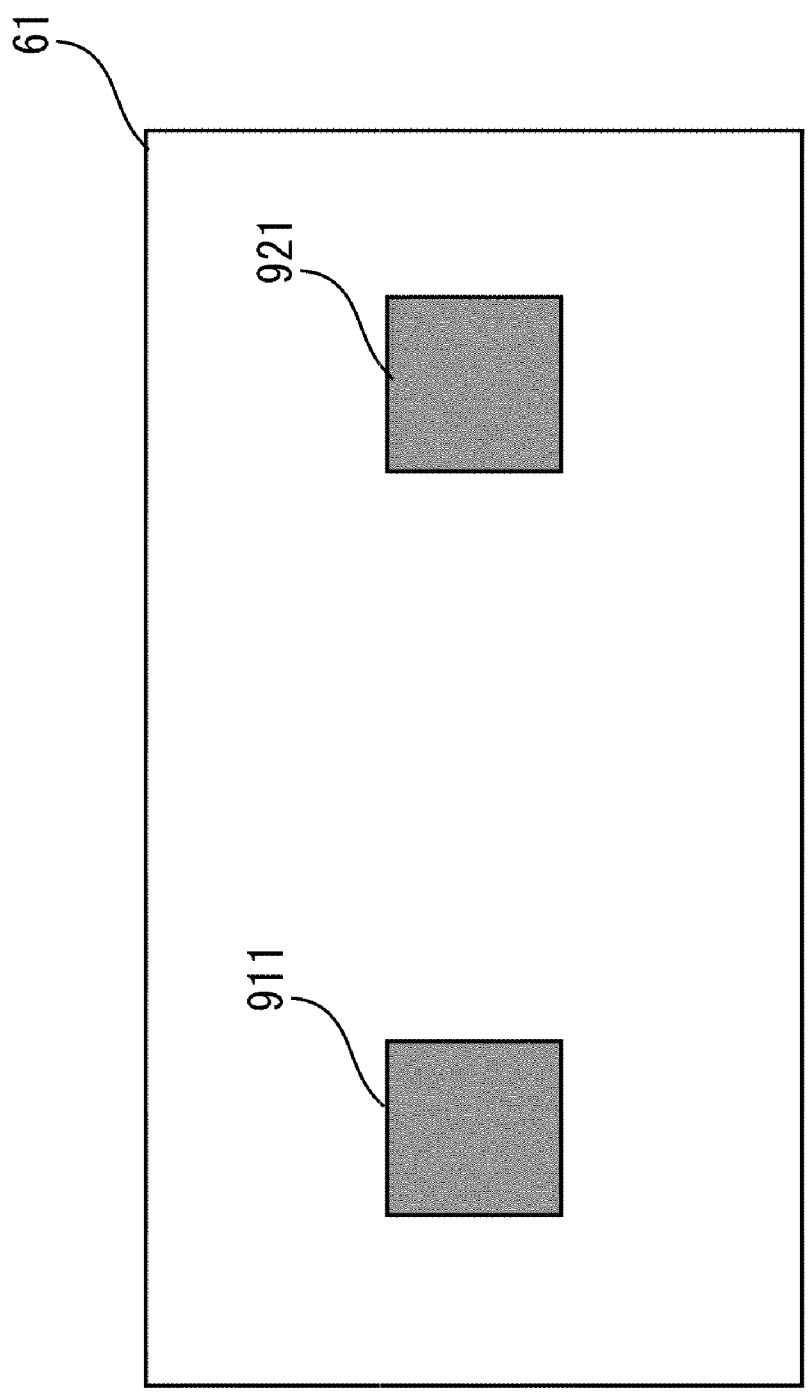

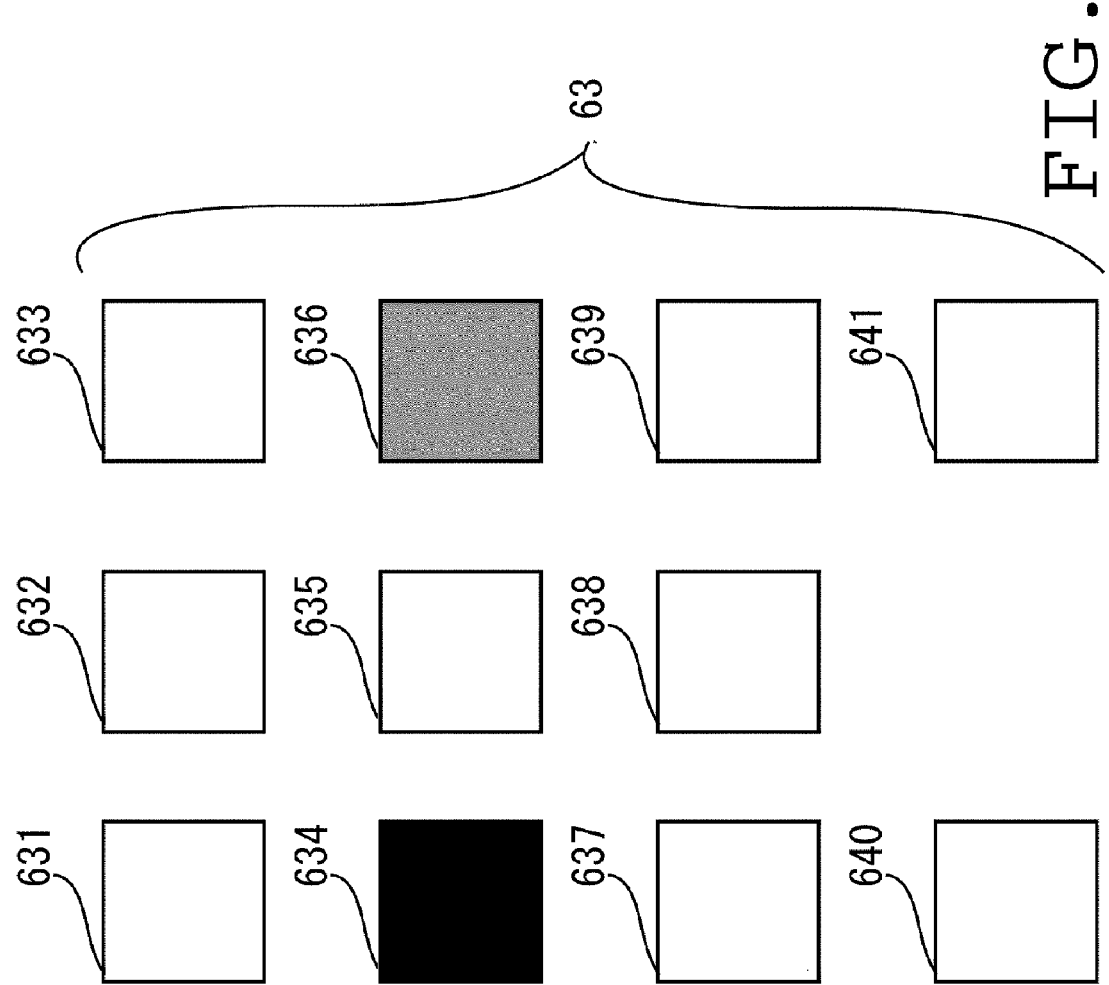

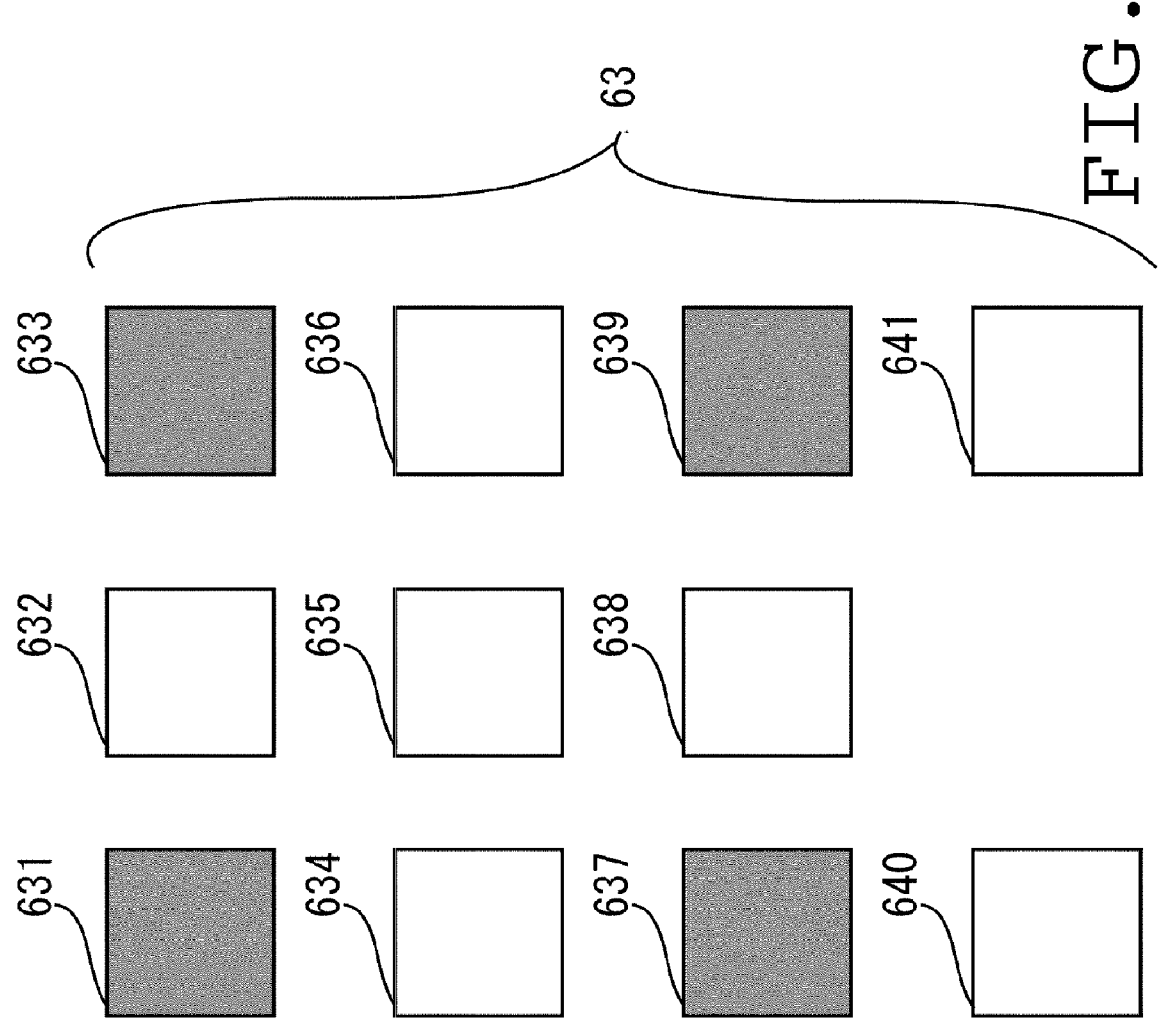

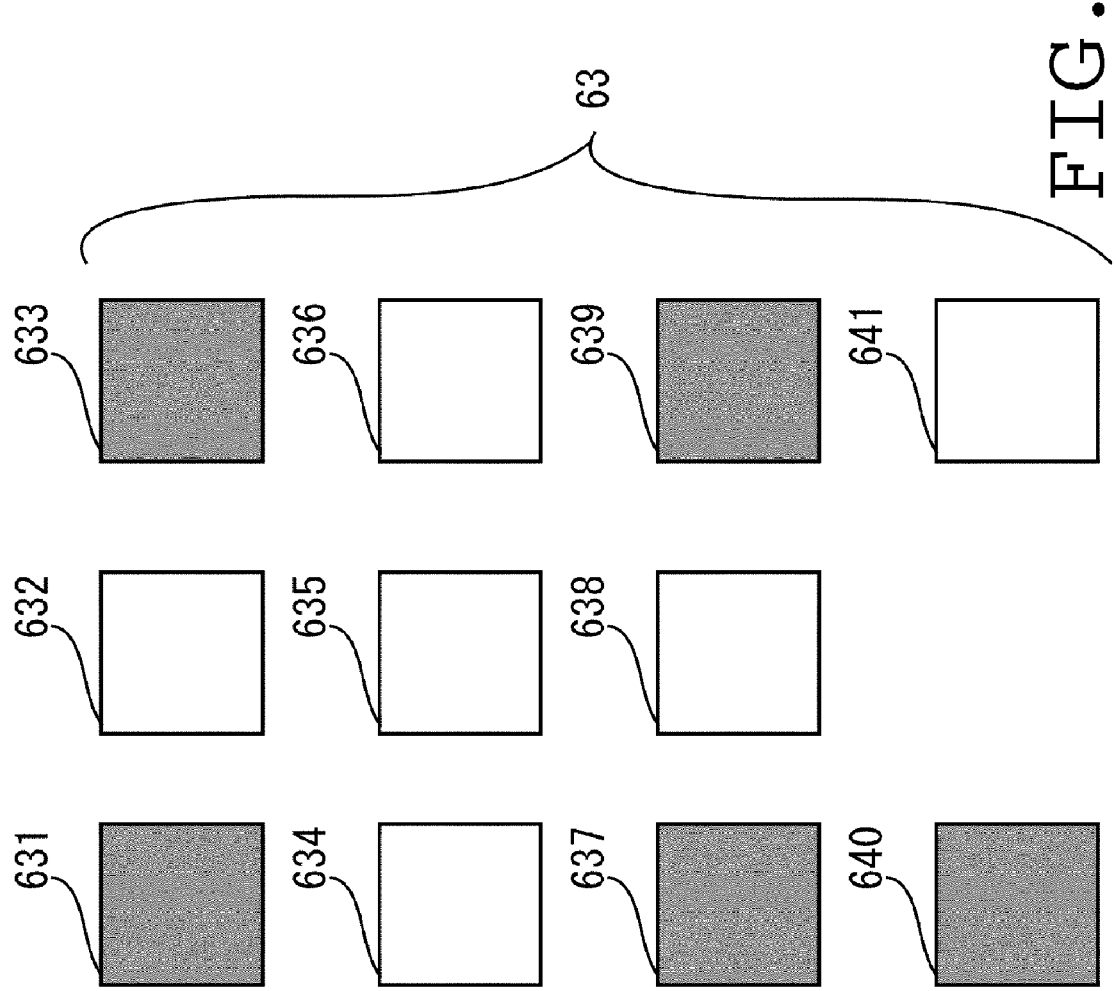

INFORMATION PROCESSING APPARATUS, IMAGE FORMING APPARATUS, AND PROCESSING IMAGE SELECTION METHOD

INCORPORATION BY REFERENCE

This application is based on and claims the benefit of priority from Japanese Patent Application No. 2014-221680 filed on Oct. 30, 2014, the contents of which are hereby incorporated by reference.

BACKGROUND

The present disclosure relates to an information processing apparatus that displays an image, dividing it into a plurality of processing image areas, and allows selection of a desired processing image area from among them, an image forming apparatus, and a processing image selection method.

This type of information processing apparatus uses partial images cut out from a document image for displaying it in a list, thereby improving the visibility of the image that is to be displayed as a list.

In recent years, the image forming apparatuses have been requested of reduction in cost. A typical image forming apparatus is loaded with a highly functional LCD, such as a dot matrix LCD, such that the user can comprehend the contents of the partial images. With this image forming apparatus, the LCD, which is expensive, is responsible for an increased cost of the apparatus.

SUMMARY

In order to achieve the purpose of suppressing an increase in cost as described above, an information processing apparatus of the present disclosure includes a division number questioning part, an answer receiving part, an image dividing part, and a processing image selection part. The division number questioning part asks a user a question about a required number of divisions of an image. The answer receiving part receives an answer of the user to the question of the division number questioning part. The image dividing part divides the image into processing image areas by the required number of divisions that is given by the answer that has been received by the answer receiving part. Upon one of keys corresponding to the respective processing image areas that have been generated by the image dividing part being operated, the processing image selection part selects the processing image area corresponding to the one of the keys as a processing object.

In addition, the processing image selection method of the present disclosure includes asking a user a question about a required number of divisions of an image; receiving an answer of the user to this question; dividing the image into processing image areas by the required number of divisions that is given by that answer; and selecting, upon one of keys corresponding to the processing image areas that have been generated being operated, the processing image area corresponding to the one of the keys as a processing object.

BRIEF DESCRIPTION OF THE DRAWINGS

FIG. 5 is an explanatory view illustrating a method of division display of an image in a display part in FIG. 1;

FIG. 6B is a first schematic diagram illustrating highlighting in the ten-key board;

FIG. 7A is a schematic diagram illustrating a division display in the display part, being the same as that in FIG. 6A;

FIG. 7B is a schematic diagram illustrating a reporting display in the ten-key board;

FIG. 8B is a second schematic diagram illustrating highlighting in the ten-key board;

FIG. 10 is a fourth schematic diagram illustrating the relation between the division display in the display part and highlighting in the ten-key board.

DETAILED DESCRIPTION

<Embodiment>
[Configuration of Image Forming Apparatus 1]

Figure 1:
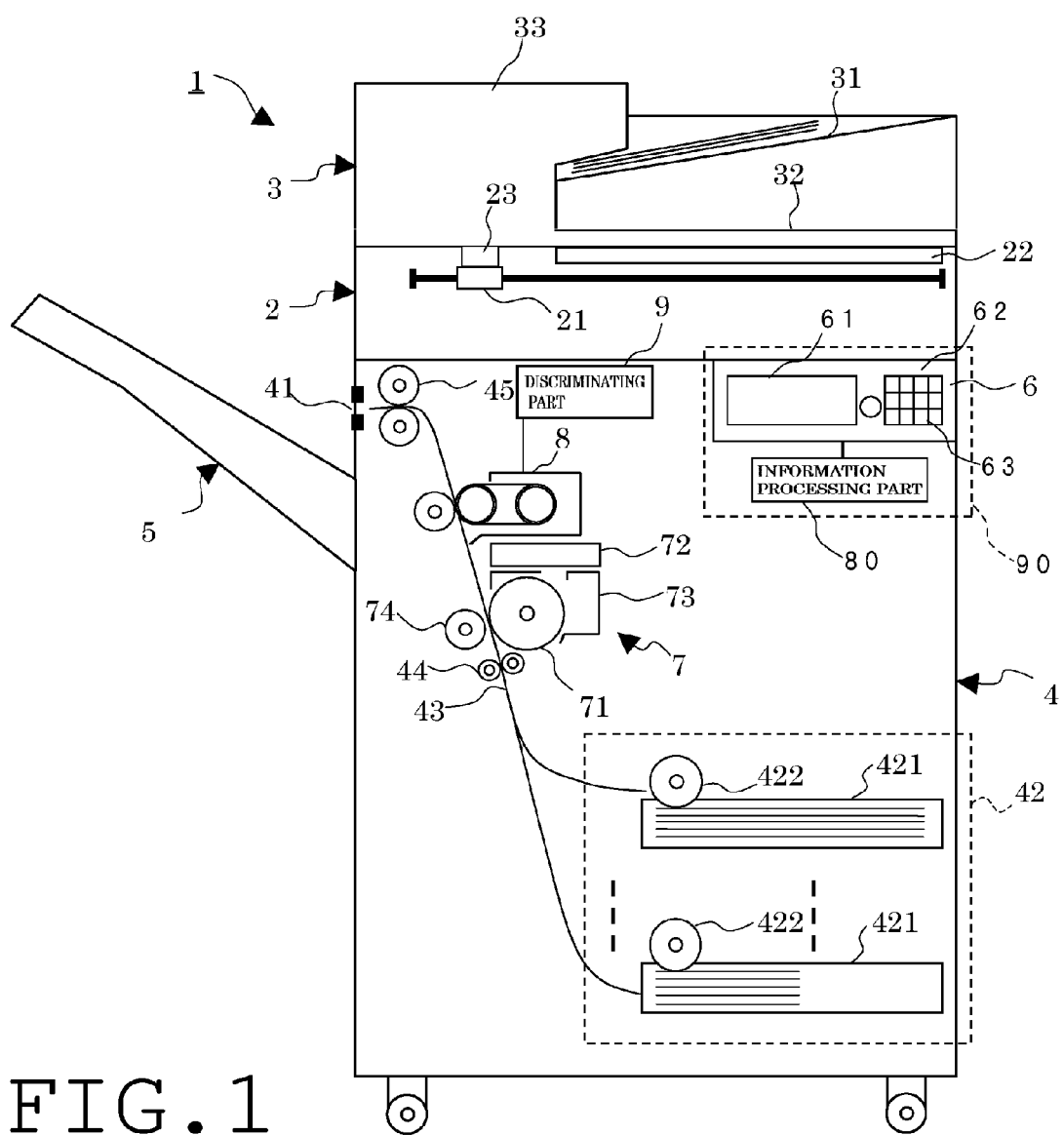
FIG. 1 is a structural drawing of an image forming apparatus of one embodiment of the present disclosure.

First, with reference to FIG. 1, the configuration of an image forming apparatus 1 according to an embodiment of the present disclosure will be explained.

The image forming apparatus 1 includes a document reading part 2, a document feeding part 3, a main body part 4, a stack tray 5, and an operation panel part 6.

The document reading part 2 is disposed on top of the main body part 4, and the document feeding part 3 is disposed on top of the document reading part 2. The stack tray 5 is disposed on the side of a recording paper delivery port 41 provided in the main body part 4, and the operation panel part 6 is disposed on the front side of the main body part 4.

The document reading part 2 includes a scanner 21, a platen glass 22, and a document reading slit 23. The scanner 21 is composed of such components as an exposure lamp, and a CCD (Charge Coupled Device) or CMOS (Complementary Metal Oxide Semiconductor) imaging sensor, and is configured to be movable in a direction of carrying a document by the document feeding part 3. The platen glass 22 is a document table formed of a transparent material. The document reading slit 23 has a slit that is formed in a direction orthogonal to the direction of carrying of a document by the document feeding part 3.

When reading a document placed on the platen glass 22, the scanner 21 is moved to a position opposed to the platen glass 22. Then, the scanner 21 reads the document placed on the platen glass 22 while scanning the document, the control part 90 included in the main body part 4 acquiring image data.

Further, when reading a document carried by the document feeding part 3, the scanner 2 is moved to a position opposed to the document reading slit 23. Then, the control part 90 included in the main body part 4 reads the document through the document reading slit 23 in synchronization with the document carrying operation of the document feeding part 30 to acquire image data.

The document feeding part 3 includes a document mounting part 31, a document discharge part 32, and a document carrying mechanism 33. The documents placed on the document mounting part 31 are fed sheet by sheet in turn by the document carrying mechanism 33 to be carried to a position opposed to the document reading slit 23, and thereafter discharged into the document discharge part 32. The document feeding part 3 is configured to be tiltable, and by bringing the document feeding part 3 upward, the top face of the platen glass 22 can be opened.

The main body part 4 includes an image forming part 7, as well as a paper feeding part 42, a carrying passage 43, a pair of conveyance rollers 44, and a pair of discharge rollers 45. The paper feeding part 42 includes a plurality of paper feeding cassettes 421 for storing recording sheets different in size or orientation, respectively, and a feed roller 422 for feeding the recording sheets one by one from the respective paper feeding cassettes to the carrying passage 43.

The feed roller 422, the pair of conveyance rollers 44, and the pair of discharge rollers 45 function as a conveyance part. The recording sheet is conveyed by this conveyance part. The recording sheet fed by the feed roller 422 into the paper carrying passage 43 is conveyed by the pair of conveyance rollers 44 into the image forming part 7.

Then, the recording sheet that has been provided with a record by the image forming part 7 is guided by the pair of discharge rollers 44 to be delivered to the stack tray 5.

The operation panel part 6 includes a display part 61, which uses an inexpensive display unit, such as a 7-segment LED, a start key, a ten-key board 63, a button for selecting operation-mode, such as copying, facsimile transmission, or scanner, and an input part 62 for giving an instruction on printing, transmission, reception, storage, or recording. The operation panel part 6 receives an instruction input by the user from the input part 62 of the image forming apparatus 1.

Figure 2:
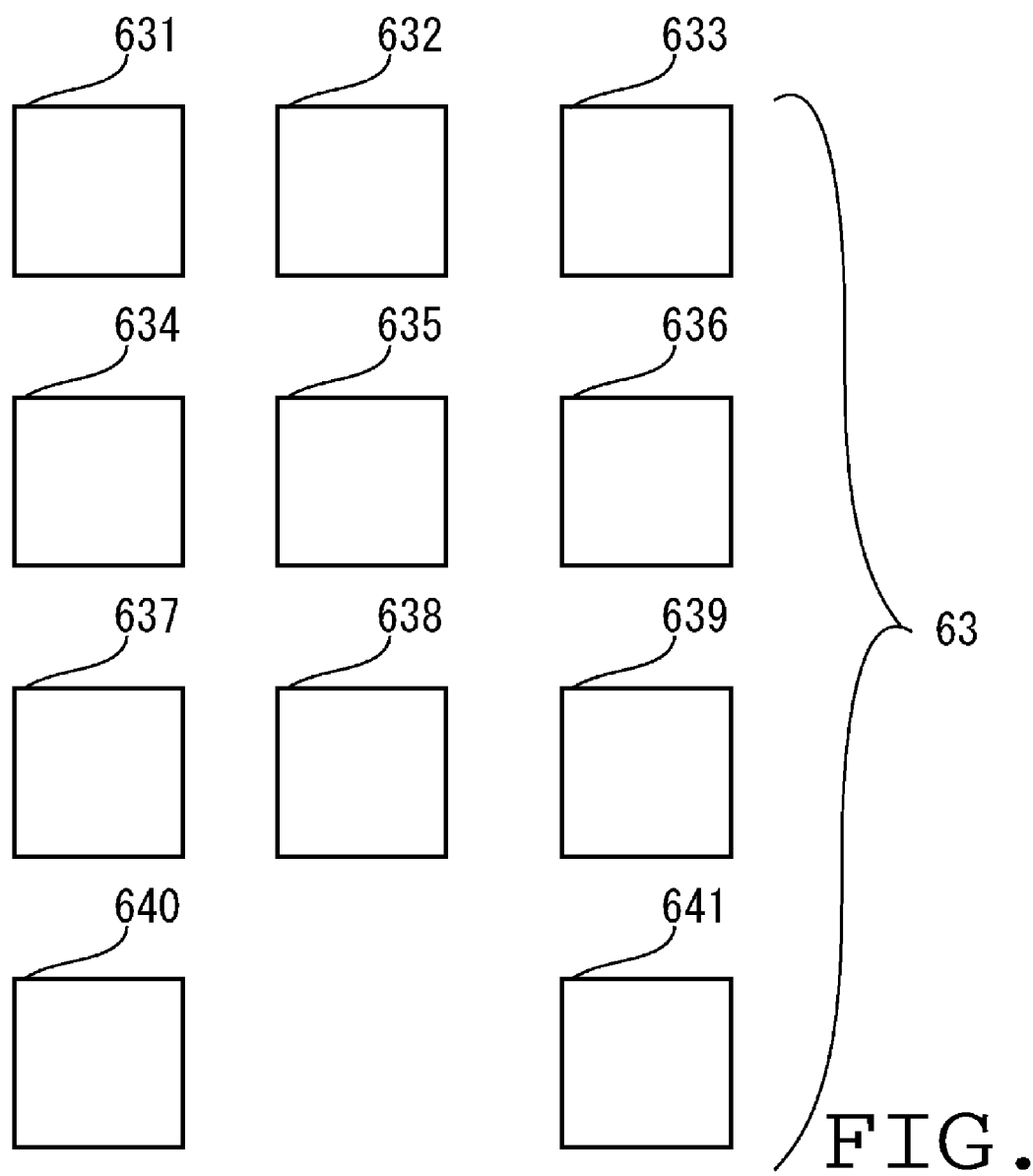
FIG. 2 is a layout view illustrating the layout of the keys in a ten-key board which is included in an input part in FIG. 1.

In addition, the operation panel part 6 receives an authentication input by the user. As shown in FIG. 2, the ten-key board 63 is comprised of nine keys 631 to 639, which are arranged in vertical three rows and horizontal three columns, and two keys 640 and 641, which are arranged right and left under the nine keys 631 to 639.

The image forming part 7 includes a photosensitive drum 71, an exposure part 72, a developing part 73, a transfer part 74, and a fixing part 8. The exposure part 72, which is an optical unit including a laser device, a mirror, a lens, and the like, outputs light on the basis of the image data to expose the photosensitive drum 71, thereby forming an electrostatic latent image on the surface of the photosensitive drum 71. The developing part 73, which is a developing unit using toner to develop the electrostatic latent image formed on the photosensitive drum 71, causes a toner image based on the electrostatic latent image to be developed on the photosensitive drum 71.

The transfer part 74 transfers the toner image formed on the photosensitive drum 71 by the developing part 73 onto a recording paper. The fixing part 8 heats the recording paper onto which the toner image has been transferred by the transfer part 74, thereby fixing the toner image onto the recording paper.

Figure 3:
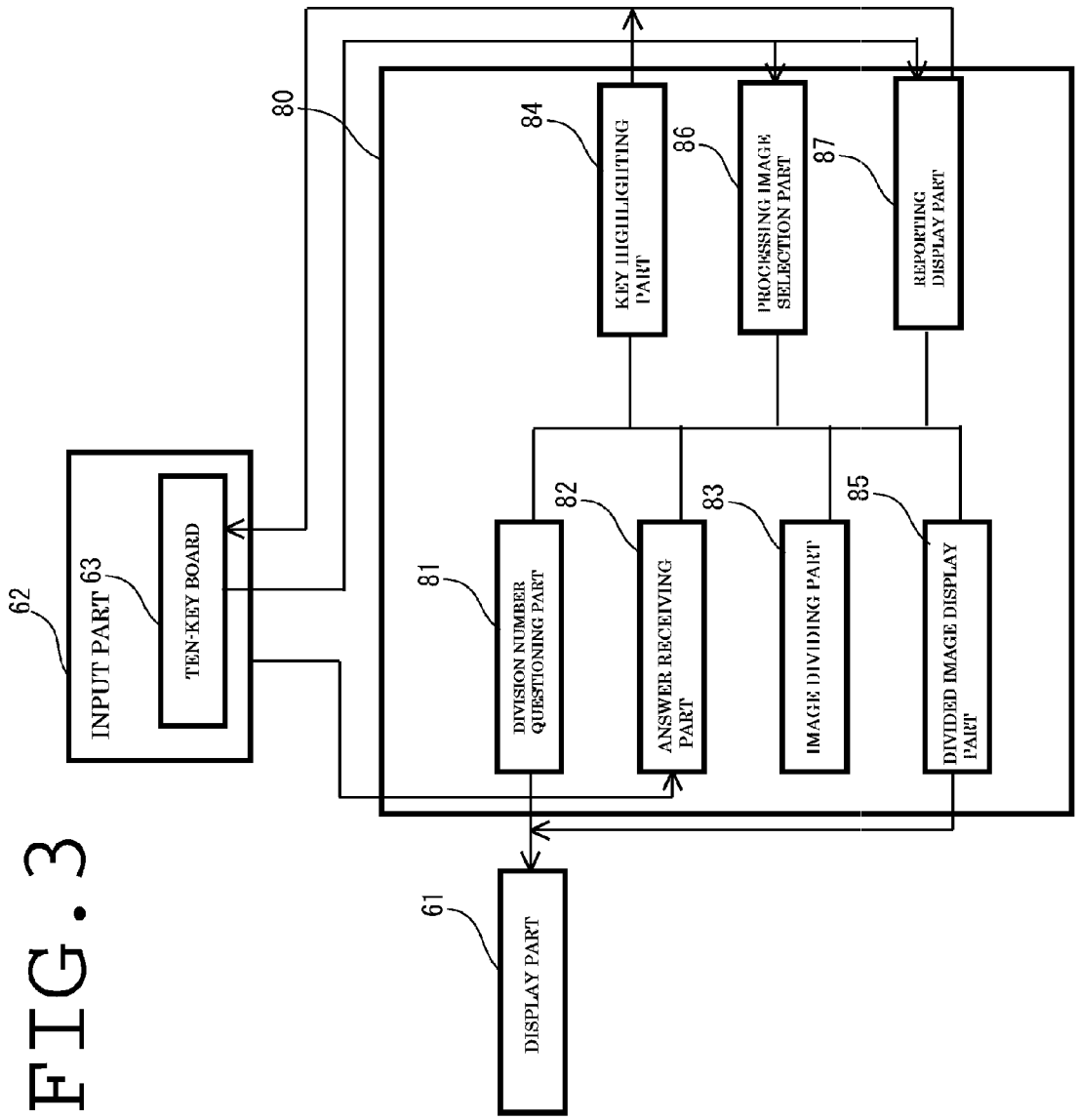
FIG. 3 is a block diagram illustrating a schematic configuration of an information processing apparatus which is included in the image forming apparatus in FIG. 1.

Next, with reference to FIG. 3, an information processing part 80 will be explained which is provided for the image forming apparatus 1 to select a printing image on the basis of the user's instruction.

The information processing part 80 includes a division number questioning part 81, an answer receiving part 82, an image dividing part 83, a key highlighting part 84, a divided image display part 85, a processing image selection part 86, and a reporting display part 87.

The division number questioning part 81 is provided for questioning about a required number of divisions of an image on a display of the display part 61 included in the operation panel part 6. The required number of divisions of an image is questioned in a required number of divisions of the image in a horizontal direction and a vertical direction. The question by the division number questioning part 81 may be performed in the form in which a question of "Into what number is it to be divided?" is given to the user to cause him or her to input a required number of divisions, or in the form in which choices are displayed for the user to select a required number of divisions.

When the user operates the input part 62 to give an answer to the question by the division number questioning part 81 on the display part 61, the answer receiving part 82 receiving the answer.

The image dividing part 83 divides the image into processing image areas on the basis of the answer of the user that has been received by the answer receiving part 82, in other words, the required number of divisions that has been answered by the user to the question of the division number questioning part 81.

The key highlighting part 84 highlights keys in the ten-key board 63 by flashing them that correspond to the respective processing image areas that have been division-displayed by the image dividing part 83.

The divided image display part 85 displays the processing image areas in the display part 61 such that the layout of the respective processing image areas in the printing image that have been division-displayed by the image dividing part 83 is approximately matched with the layout of the relevant keys in the ten-key board 63.

When a key in the ten-key board 63 that is indicated by flashing by the key highlighting part 84 is operated, the processing image selection part 86 selects the processing image area that corresponds to the key in the ten-key board 63 as an object of printing process.

When a key in the ten-key board 63 that is indicated by flashing by the key highlighting part 84 is operated, the reporting display part 87 indicates the key in the ten-key board 63 by lighting it up to thereby report that the processing image area corresponding to the key in the ten-key board 63 that has been operated has been selected as a processing object.

Figure 4:
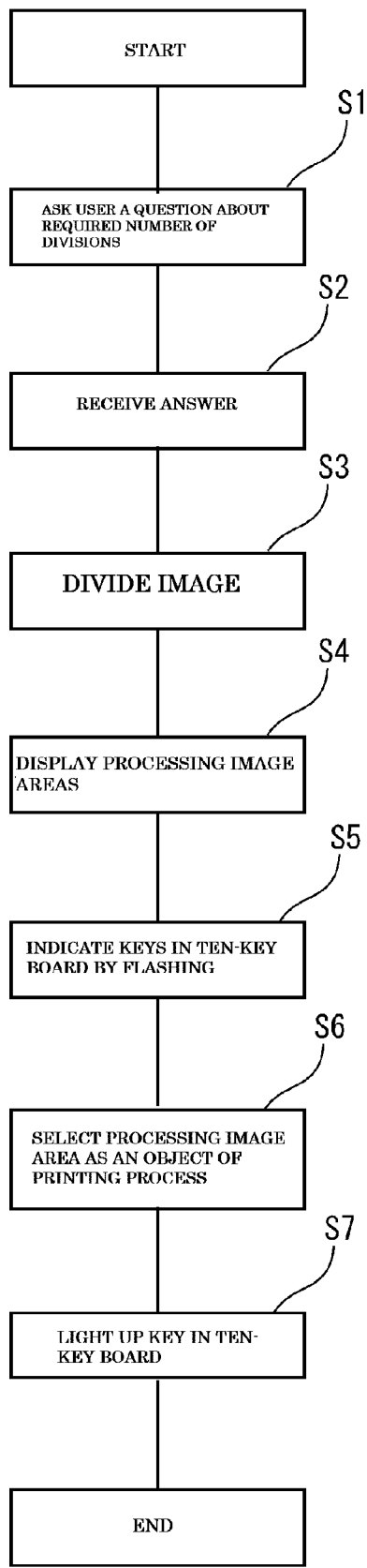
FIG. 4 is a flowchart illustrating an outline of the procedure for a process by the information processing apparatus.

Next, with reference to FIG. 4, the process in which the information processing part 80 is used for selecting a processing image area as a particular page to be processed from among the printing images will be explained.

This process is executed when the user operates the input part 62 to make a processing request, such as that for printing of an image.

When the above-mentioned processing request is made by the user, first on the display of the display part 61 included in the operation panel part 6, the division number questioning part 81 asks the user a question about a required number of divisions of the image (S1).

When the user, who has seen a question on the display part 61, operates the input part 62 to make an answer to the question, the answer receiving part 82 receives the answer (S2).

When the answer receiving part 82 receives the answer of the user, the image dividing part 83 divides the image into processing image areas by the required number of divisions indicated in the answer (S3).

When the image dividing part 83 divides the image into processing image areas, the divided image display part 85 displays the processing image areas on the display part 61 (S4).

In addition, the keys in the ten-key board 63 that correspond to the respective processing image areas that have been generated by division by the image dividing part 83 are indicated by flashing by the key highlighting part 84 (S5).

When the user ascertains the processing image areas being displayed in the display part 61, and the relevant keys in the ten-key board 63 being flashed, and operates a key in the ten-key board 63 that corresponds to the processing image area to be processed, the processing image selection part 86 selects the processing image area corresponding to the key in the ten-key board 63 as an object of the printing process (S6).

In addition, the key in the ten-key board 63 that has been operated by the user is displayed by lighting it up by the reporting display part 87 (S7).

Thereafter, in accordance with the operation of the input part 62 by the user, the image forming apparatus 1 makes such an operation as printing of the processing image area that has been selected by the processing image selection part 86.

Next, the relation between the display of the processing image areas in the display part 61 and the display in the ten-key board 63 will be explained.

When the user makes a request for division of an image in a vertical N-division and horizontal M-division manner, as shown in FIG. 5, the display part 61 provides a display of "N-up (MN in 1)", in which the processing image areas are arranged in N rows along a vertical direction and M columns along a horizontal direction. In this display, the processing image areas are arranged in N rows in a vertical direction from the processing image area 911*c* to that 91N*c*, while the processing image areas are arranged in M columns in a horizontal direction from the processing image area 911*c* to that 9M1*c*.

Figure 6A:
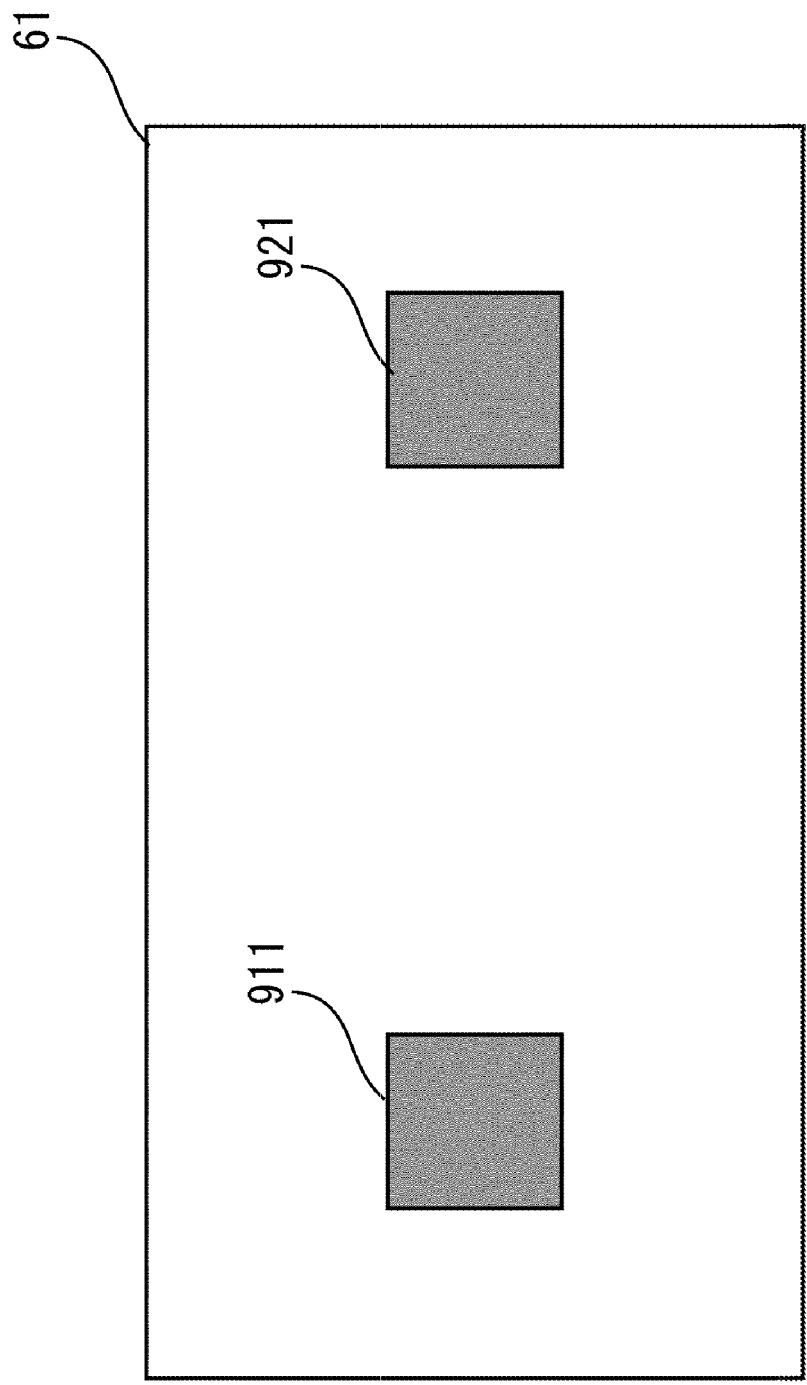
FIG. 6A is a first schematic diagram illustrating a division display in the display part.

For example, when the user makes a request for division of an image in a vertical one-division and horizontal two-division manner, as shown in FIG. 6A, the display part 61 provides a division display of "2 in 1", in which two processing image areas 911 and 921 are horizontally arranged. With the division display of "2 in 1" shown in FIG. 6A, as shown in FIG. 6B, the key 634 on the left-hand side in the second row is indicated by flashing, being associated with the processing image area 911 division-displayed on the left-hand side, while the key 636 on the right-hand side in the second row is indicated by flashing, being associated with the processing image area 912 division-displayed on the right-hand side.

In addition, when, with a division display of "2 in 1" shown in FIG. 7A, the key 634 on the left-hand side in the second row is operated, thereby the processing image area 911 being selected, the key 634 is indicated by lighting it up as shown in FIG. 7B. Changing in the indication of the key 634 from that by flashing it to that by lighting it up allows the user to know that the processing image area 911 corresponding to the key 634 has been selected.

Figure 8A:
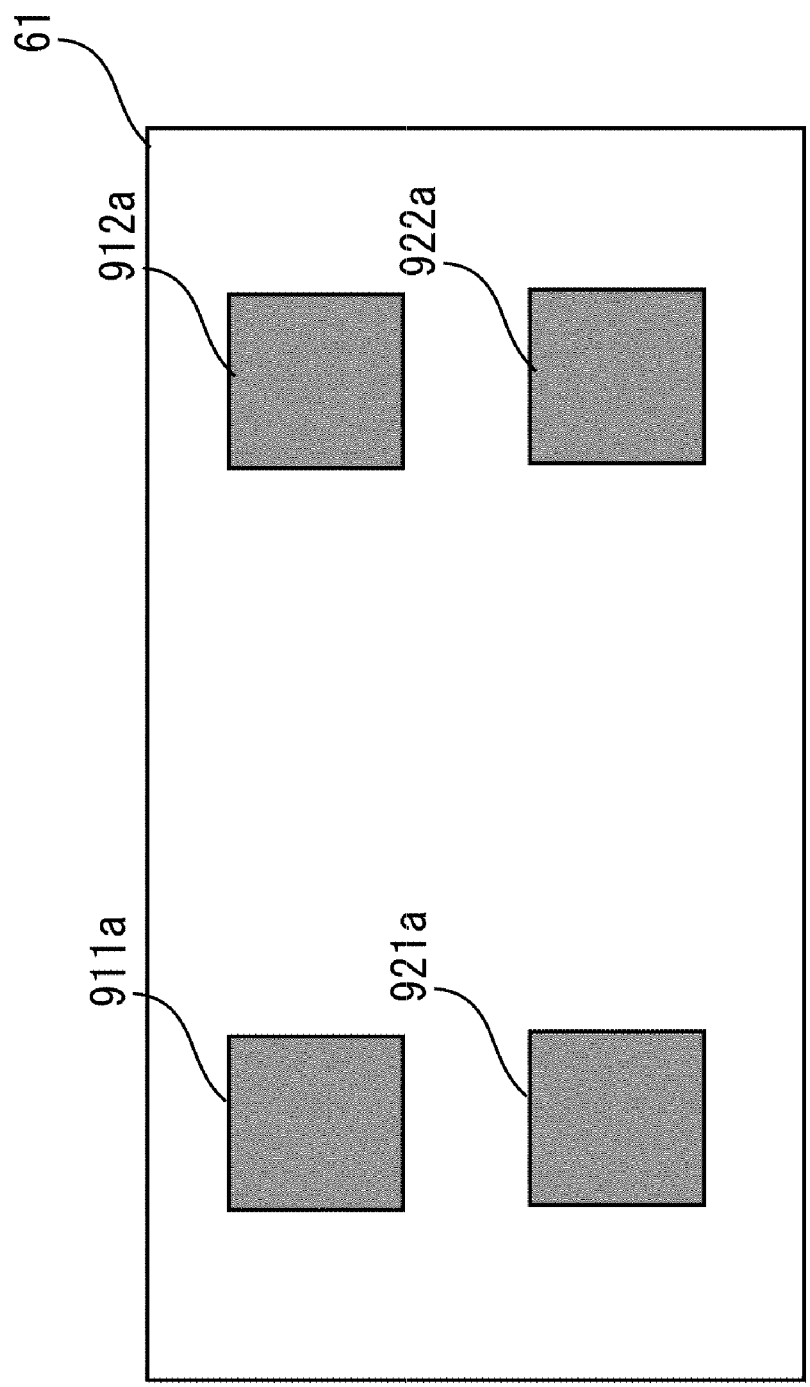
FIG. 8A is a second schematic diagram illustrating a division display in the display part.

Further, when the user makes a request for division of an image in a vertical two-division and horizontal two-division manner, as shown in FIG. 8A, the display part 61 provides a division display of "4 in 1", in which the four processing image areas 911*a*, 921*a*, 912*a*, and 922*a* are arranged in vertical and horizontal directions two by two. With the division display of "4 in 1" shown in FIG. 8A, as shown in FIG. 8B, the key 631 on the left-hand side in the first row is indicated by flashing, being associated with the processing image area 911*a* at upper left, while the key 633 on the right-hand side in the first row is indicated by flashing, being associated with the processing image area 912*a* at upper right. In addition, as shown in FIG. 8B, the key 637 on the left-hand side in the third row is indicated by flashing, being associated with the processing image area 921*a* at lower left, while the key 639 on the right-hand side in the third row is indicated by flashing, being associated with the processing image area 922*a* at lower right.

Figure 9A:
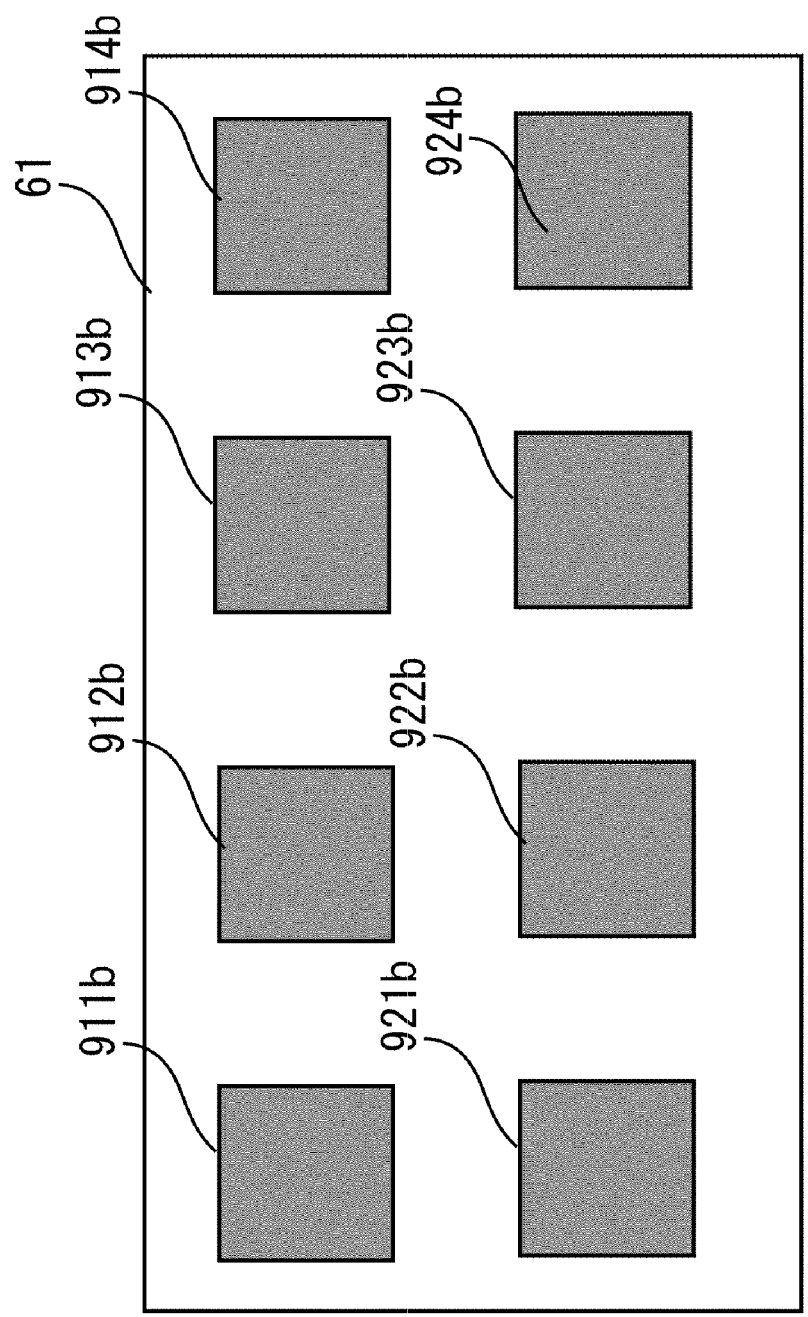
FIG. 9A is a third schematic diagram illustrating a division display in the display part.

Further, when the user makes a request for division of an image in a vertical two-division and horizontal four-division manner, as shown in FIG. 9A, the display part 61 provides a division display of "8 in 1", in which the eight processing image areas 911*b*, 921*b*, 912*b*, 922*b*, 913*b*, 923*b*, 914*b*, and 924*b* are horizontally arranged in two rows in a vertical direction.

Figure 9B:
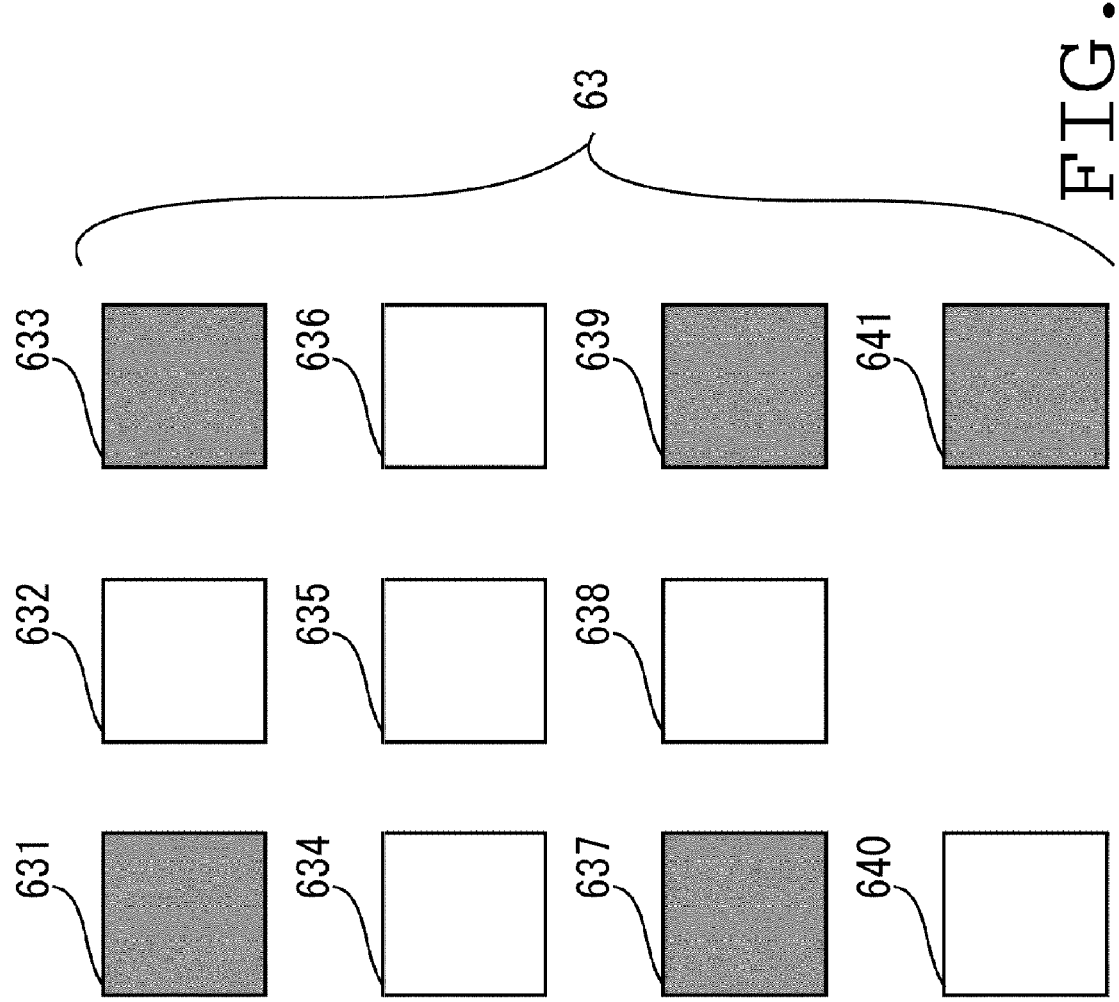
FIG. 9B is a third schematic diagram illustrating highlighting in the ten-key board.

With the division display of "8 in 1" shown in FIG. 9A, as shown in FIG. 9B, the key 631 on the left-hand side in the first row is indicated by flashing, being associated with the processing image area 911*b* at upper left, while the key 633 on the right-hand side in the first row is indicated by flashing, being associated with the processing image area 912*b*. In addition, as shown in FIG. 9B, the key 637 on the left-hand side in the third row is indicated by flashing, being associated with the processing image area 921*b* division-displayed at lower left, while the key 639 on the right-hand side in the third row is indicated by flashing, being associated with the processing image area 922*b*. In addition, the key 641 on the right-hand side in the fourth row is indicated by flashing.

With the division display of "8 in 1" shown in FIG. 9A, every time the key 641 on the right-hand side in the fourth row is operated, the processing image areas that are associated with the keys in the ten-key board 63 that are indicated by flashing are displaced by two columns to the right-hand side. Further, every time the key 640 on the left-hand side in the fourth row is operated, the processing image areas that are associated with the keys in the ten-key board 63 that are indicated by flashing are displaced by two columns to the left-hand side.

When there is brought about a state in which, on the right-hand side of the processing image areas that are associated with the keys in the ten-key board 63 that are indicated by flashing, there is no processing image area, the flashing indication of the key 641 on the right-hand side in the fourth row is terminated. On the other hand, when there is brought about a state in which, on the left-hand side of the processing image areas that are associated with the keys in the ten-key board 63 that are indicated by flashing, there is no processing image area, the flashing indication of the key 640 on the left-hand side in the fourth row is terminated.

For example, when, with a division display of "8 in 1" shown in FIG. 9A being performed, the key 641 on the right-hand side in the fourth row is operated, the processing image areas that are associated with the keys 631, 633, 637, and 639 in the ten-key board 63 that are indicated by flashing are displaced from the processing image areas 911*b*, 912*b*, 921*b*, and 922*b* to the processing image areas 913*b*, 914*b*, 923b, and 924b, which are located on the right-hand side of the processing image areas 911b, 912b, 921b, and 922b by two columns. Further, this brings about a state in which, on the right-hand side of the processing image areas that are associated with the keys in the ten-key board 63 that are indicated by flashing, there is no processing image area, and on the left-hand side of the same, there are processing image areas, thereby, as shown in FIG. 10, the flashing indication of the key 641 on the right-hand side in the fourth row being terminated, while the key 640 on the left-hand side being indicated by flashing.

With the configuration as described above, the following advantages will be obtained.

According to the present embodiment, the user specifies a required number of divisions of an image, and the user operates a specific one of the keys in the ten-key board 63 that correspond to the processing image areas for the required number of divisions, thereby selecting the processing image area as a processing object. Therefore, the user can select a specific processing image area from among the original image at hand by operating the ten-key board 63 for performing a process, such as printing. Thus, even if such a visibility as that which is available with a highly functional display unit is not given, the processing area can be selected. Therefore, even with a display part using an inexpensive display unit, the user can select a processing image area with no reduction in convenience.

For example, the information processing part 80 can divide the respective pages included in image data into a plurality of processing image areas to display them in the display part 61 of the operation panel part 6, and to allow the user to select a processing image area as a page to be subjected to a printing process from among the plurality of processing image areas that have been displayed.

In the above-described embodiment, the case where the information processing part 80 uses the ten-key board 63 in the operation panel part 6 to cause the user to select a processing image area has been explained. However, the key that is used to select a processing image area with the information processing part 80 is optional, and the start key, the button for selecting operation-mode, the button for giving an instruction on printing, transmission, reception, storage, or recording, or the like, may be used. In addition, these keys may be combined with the ten-key board 63 to provide a configuration for selecting a processing image area.

The layout of the processing image areas is optional, and for example, may be determined in accordance with, for example, the layout of the keys that are used for selecting a processing image area. The method of highlighting by the key highlighting part 84 is optional, and a method other than flashing may be used for highlighting. The method of reporting display by the reporting display part 87 is optional, and a method other than lighting-up indication may be used to make reporting display.

In the above-described embodiment, the case where one image that is displayed over a plurality of pages is divided into a plurality of processing image areas has been explained. However, there may be provided a configuration in which one image that is displayed in a single page is divided into a plurality of processing image areas. In addition, in the above-described embodiment, the case where the processing image areas are displayed, being arranged in the display part 61, has been explained, however, there may be provided a configuration in which the processing image areas are not displayed in the display part 61, and the user operates the keys that are previously defined in accordance with a required number of divisions of an image, with no need for referencing the display in the display part 61. In addition, there may be provided a configuration in which, with the keys that are previously defined in accordance with a required number of divisions of an image, only the display by the key highlighting part 84 or the processing image selection part 86 is performed.

In addition, in the above-described embodiment, the case where an inexpensive display unit, such as a 7-segment LED, is used for the display part 61 has been explained. However, as an inexpensive display unit, besides the 7-segment LED, a low-function LCD, or the like, may be used. Even with such a configuration, the user can select a specific processing image area from among the original image at hand by operating the ten-key board 63 for performing a process, such as printing. Thus, even if such a visibility as that which is available with a highly functional display unit is not given, the processing area can be selected. Therefore, even with a display part using an inexpensive display unit, the user can select a processing image area with no reduction in convenience.

In addition, in the above-described embodiment, the case where the keys in the ten-key board 63 that correspond to the processing image areas are indicated by flashing them or lighting them up has been explained, however, by a display method that flashes or lights up the processing image areas in the display part 61, the user may be notified of the selected or not-yet-selected state of the processing image areas to which the relevant keys in the ten-key board 63 correspond.

In addition, in the above-described embodiment, the case where either one of the key 641 on the right-hand side and the key 640 on the left-hand side in the fourth row is indicated by flashing has been explained. However, in the case where, on the right-hand side and the left-hand side of the processing image areas that are associated with the keys in the ten-key board 63 that are indicated by flashing, there is a processing image area, the key 641 on the right-hand side and the key 640 on the left-hand side in the fourth row may be indicated by flashing.

What is claimed is:

1. A processing image selection method carried out on an information processing apparatus having a keyboard comprising nine keys arranged in three rows and three columns, and further comprising two keys arranged under the nine keys, wherein the two keys comprises a first key and a second key, and wherein the first key is arranged at the left of the second key, the method comprising:

asking a user a question about a required number of divisions of an image, receiving an answer of the user to this question, dividing the image into a layout of processing image areas by the required number of divisions that is indicated by the received answer, wherein the layout of processing image areas comprises a plurality of portions comprising at least a first portion and a second portion, highlighting keys of the nine keys in a layout, wherein the layout of highlighted keys matches the first portion of the layout of processing image areas, corresponding each of the highlighted keys in the layout of keys to a respective image processing area of the first portion of the layout of processing image areas such that operation of a highlighted key of the layout of highlighted keys causes selection of the respective corresponded image processing area as a processing object, when the highlighted keys of the layout of keys are corresponded to the first portion of the layout of processing image areas:
corresponding a key of the two keys to the second portion of the layout of processing image areas such that operation of the corresponded key of the two keys causes the information processing apparatus to change the correspondence of the highlighted keys in the layout of keys to respective processing image areas of the second portion of the layout of processing image areas, and
highlighting the corresponded key of the two keys, and
selecting as a processing object, upon one of the highlighted keys in the layout of keys being operated, the processing image area corresponding to the operated highlighted key of the layout of highlighted keys.

2. The processing image selection method according to claim 1, wherein highlighting comprises flashing, and the method further comprises lighting the operated highlighted key of the layout of highlighted keys, wherein lighting comprises lighting in a manner distinctive over said flashing.

3. The processing image selection method according to claim 1, wherein:
when a portion of the layout of processing image areas is arranged at a first side of a portion to which the highlighted keys of the layout of keys are corresponded, the method further comprises highlighting the first key of the two keys and corresponding the first key to the portion of the layout of processing image areas arranged at the first side such that operation of the first key causes the information processing apparatus to change the correspondence of the highlighted keys in the layout of keys to respective processing image areas of the portion of the layout of processing image areas which is arranged at the first side; and
when a portion of the layout of processing image areas is arranged at a second side of the portion to which the highlighted keys of the layout of keys are corresponded, the method further comprises highlighting the second key of the two keys and corresponding the second key to the portion of the layout of processing image areas arranged at the second side such that operation of the second key causes the information processing apparatus to change the correspondence of the highlighted keys in the layout of keys to respective processing image areas of the portion of the layout of processing image areas arranged at the second side.

4. An information processing apparatus comprising:
a keyboard comprising nine keys arranged in three rows and three columns, and further comprising two keys arranged under the nine keys, wherein the two keys comprises a first key and a second key, and wherein the first key is arranged at the left of the second key,
a division number questioning part that asks a user a question about a required number of divisions of an image,
an answer receiving part that receives an answer of the user to the question of the division number questioning part,
an image dividing part that divides the image into a layout of processing image areas by the required number of divisions that is given by the answer that has been received by the answer receiving part,
a key highlighting part that highlights keys of the nine keys in a layout, wherein:
the layout of highlighted keys matches the layout of processing image areas or a first portion thereof, and
each of the highlighted keys in the layout of keys corresponds to a respective image processing area of the layout of processing image areas or the first portion thereof, and
when the highlighted keys correspond to the first portion of the layout of layout of processing image areas, the key highlighting part further highlights a key of the two keys in addition to the layout of highlighted keys, wherein:
the highlighted key of the two keys corresponds to a second portion of the layout of processing image areas such that operation of the highlighted key of the two keys changes the correspondence of highlighted keys in the layout of keys to a respective a respective image processing area of the second portion of the layout of processing image areas, and
a processing image selection part that, upon one of the highlighted keys in the layout of keys being operated, selects as a processing object the processing image area corresponding to the operated highlighted key of the layout of highlighted keys.

5. The information processing apparatus according to claim 4, wherein there is provided a divided image display part that displays the processing image areas that have been generated by the image dividing part side by side in accordance with the layout of the keys.

6. The information processing apparatus according to claim 4, wherein the division number questioning part asks the user a question about a required number of divisions of an image in a horizontal direction and a vertical direction.

7. The information processing apparatus according to claim 4, wherein there is provided a reporting display part that, upon said one of the highlighted keys in the layout of keys being operated, makes a display to report that the processing image area corresponding to the one of the key is selected as a processing object.

8. An image forming apparatus comprising an information processing apparatus according to claim 4.

9. The information processing apparatus of claim 4, wherein highlighting comprises flashing, and wherein the key highlighting part lights the operated highlighted key of the layout of highlighted keys in a manner distinctive over said flashing.

10. The information processing apparatus of claim 4, wherein:
the layout comprises a plurality of portions,
the information processing apparatus can correspond each of the highlighted keys in the layout of keys to a respective image processing area of one of said portions,
when a portion of the layout of processing image areas is arranged at a first side of the portion to which the highlighted keys of the layout of keys are corresponded:
the key highlighting part highlights the first key of the two keys, and
the information processing apparatus corresponds the first key to the portion of the layout of processing image areas arranged at the first side such that operation of the first key causes the information processing apparatus to change the correspondence of the highlighted keys in the layout of keys to respective processing image areas of the portion of the layout of processing image areas which is arranged at the first side; and when a portion of the layout of processing image areas is arranged at a second side of the portion to which the highlighted keys of the layout of keys are corresponded:
the key highlighting part highlights the second key of the two keys, and
the information processing apparatus corresponds the second key to the portion of the layout of processing image areas arranged at the second side such that operation of the second key causes the information processing apparatus to change the correspondence of the highlighted keys in the layout of keys to respective processing image areas of the portion of the layout of processing image areas which is arranged at the second side.

* * * * *